United States Patent [19]

Hirano et al.

[11] Patent Number: 4,759,008

[45] Date of Patent: Jul. 19, 1988

[54] LOADING MECHANISM FOR DISK PLAYER

[75] Inventors: Toshio Hirano; Isami Kenmotsu, both of Saitama, Japan

[73] Assignee: Pioneer Electronic Corporation, Tokyo, Japan

[21] Appl. No.: 103,867

[22] Filed: Oct. 2, 1987

[30] Foreign Application Priority Data

Oct. 2, 1986 [JP] Japan .............................. 61-235363

[51] Int. Cl.[4] .......................... G11B 17/04; G11B 1/00
[52] U.S. Cl. .................................... 369/75.2; 369/187; 369/197; 369/265
[58] Field of Search ...................... 369/75.2, 265, 197, 369/198, 239, 187, 188, 184

[56] References Cited

U.S. PATENT DOCUMENTS

| | | | |
|---|---|---|---|
| 4,575,836 | 3/1986 | Seto | 369/197 |
| 4,631,716 | 12/1986 | Ikedo et al. | 369/75.2 |
| 4,701,901 | 10/1987 | Imai | 369/75.2 |
| 4,715,025 | 12/1987 | Eijsermans | 369/75.2 |

FOREIGN PATENT DOCUMENTS 227280 10/1986 Japan ................................. 369/265

Primary Examiner—Steven L. Stephan
Attorney, Agent, or Firm—Sughrue, Mion, Zinn, Macpeak & Seas

[57] ABSTRACT

A front-loading type disk player, such as a video or compact disk player, having an improved front loading mechanism which absorbs any play or backlash that occurs during the movement of the carriage so that the carriage is accurately controlled in position as it moves in and out of the housing of the player. Support members for the chassis have a stopper with which the carriage comes into contact when the disk reaches a predetermined playing or recording position. An energizing force is applied during the time an accelerating mechanism drives the carriage in the direction of the accommodation position inside the housing, continuing for a short time after the carriage contacts the stopper. The excess force is absorbed by urging the carriage against the stopper.

5 Claims, 9 Drawing Sheets

LOADING MECHANISM FOR DISK PLAYER

BACKGROUND OF THE INVENTION

The present invention relates to a disk player and, more particularly, to a front loading type disk player equipped with a carrying transport mechanism that automatically conveys a disk type recording medium between a recording/reproducing position inside the housing of the player and a loading/unloading position where it is projected from the housing.

A front loading disk player is known in which an audio disk, such as an analog recording medium having a sound groove cut into its surface or a digital audio disk having digital PCM signals recorded on its surface, is held on a carriage that can be slid to project from the front of a player housing or which can be entirely accommodated within the housing. In such a front loading player, the space on the top of the player can be utilized, for example, to support another audio system device.

Such a front loading disk player is basically composed of the following components: a player housing; a playing mechanism accommodated in the housing and which is composed of such parts as a turnable for supporting and rotating the recording medium, a mechanism that automatically starts, drives and stops the disk type recording medium on the turntable, and a pickup for effecting information recording or reproduction from the recording medium; a carriage that holds, guides and transports the disk to the playing position; and a transport mechanism for moving the carriage to a loading/unloading position in which the carriage projects from the housing or to a recording and reproducing position inside the housing.

The transport mechanism employed in a typical conventional front loading disk player, however, does not protrude completely from the housing, but can slide only partly to the outside of the latter. The user, therefore, has to pull the carriage manually to the position necessary for loading or unloading the disk, and once the disk has been loaded into the carriage, the carriage must be pushed into a position where reading and reproducing can be started. In other words, the loading mechanism in the conventional front loading disk player is only semi-automatic.

A need therefore exists to permit the carriage to project and to be accommodated completely in a fully automatic way, thereby simplifying to a maximum extent the procedures of loading and playing a disk type recording medium.

It is rather easy to design various types of fully automatic loading mechanism if several independent drive sources are available, a relatively large number of control switches are used, and if the depth of the player housing is great enough to provide a large space. On the other hand, it is difficult to design a fully automatic loading mechanism while satisfying the requirement for a small overall size using a single drive source (i.e., one motor) and a player housing with a minimum depth.

The assignee of the present invention has though successfully developed a loading mechanism that basically satisfied such challenging design conditions. The heart of this such loading mechanism is an operation control member installed on the rising portion of a chassis (this portion is hereinafter referred to as a subchassis) and which is designed so that it can be moved toward or away from the user without exceeding the depth of the player housing, even if it is moved to the extreme end in either direction. By moving this control member toward and away from the user over a restricted range, the carriage is allowed to projected to an unloading position, be accommodated in the housing, and be lowered in association with the playing mechanism with the disk type recording medium being subsequently loaded and clamped on the turntable at a recording or reproducing position. The sequence of these operations is performed in a controlled manner, with the motor (drive source) being simply used to impart a driving force that causes the operation control member to be moved either toward or away from the user. In short, the operation control member is the key factor to the operation of the new loading mechanism. The drive force imparted to this operation control member is converted to a force that causes movement in the forward or backward direction with respect to the chassis. With this movement used as a secondary drive source, the carriage is subjected to an accelerated movement either toward the user (i.e., in such a way that it projects to the unloading position), or away from the user (i.e., in such a way that it is accommodated in the housing). The carriage is then lowered in association with the playing mechanism as its position is properly controlled, and, finally, the disk type recording medium is loaded and clamped on the turntable at the recording or reproducing position. While the operation control member performs these several functions, the drive force is distributed in such a way that the individual components and mechanisms are operated in a controlled, timed and smooth manner.

The system described above is very effective for the purpose of reducing the size and weight of the operating mechanism, the number of parts, and the total costs.

However, this loading mechanism, in which the drive force imparted to the operation control member is transmitted via a number of components to effect various kinds of operations, suffers from the inevitable disadvantage that the number of tolerances (amounts of play) between adjacent components is increased. The tolerances stack so as to reduce the operational precision and cause a delay (i.e., backlash) in the movement of the overall mechanism. In particular, if the movement is amplified by some accelerating device, such play or backlash is also amplified, causing a marked drop in operational precision. This phenomenon is not a problem in cases where no high operational precision is required, but presents a serious problem in other situations, such as where it is necessary to lower the carriage in the loading direction with its position being precisely controlled in order to accurately clamp the recording medium at the recording or reproducing position. This is particularly true for the case where the carriage is to be moved away from the user (i.e., in the direction in which it is accommodated in the housing). If a large delay or excessive play occurs in the movement of the carriage in this direction, the position at which the carriage is lowered will be offset and the position at which the disk is switched from the recording to reproducing position or vice versa inaccurately determined, causing a serious problem, namely, inability to switch between the recording and reproducing positions of the disk.

SUMMARY OF THE INVENTION

An object, therefore, of the present invention is to provide a loading mechanism that effectively absorbs any play or backlash that occurs during the movement of the carriage so that the carriage is accurately controlled in position as it is lowered together with a support member, ensuring that the disk will always be transported to the position where correct conversion can be effected from the recording mode to the playing mode.

The above-stated object of the present invention can be attained by a loading mechanism for a disk player having the following four basic components: (1) a player housing; (2) playing means disposed in the housing including a turntable for supporting a disk type recording medium, a mechanism that automatically starts, drives and stops the disk type recording medium on the turntable, and a converter for recording or reproducing information from the disk type recording medium; (3) a carriage that holds, guides and transports the disk type recording medium to be played; and (4) transport means for moving the carriage to an unloading position in which the carriage projects from the player housing, or to a recording or reproducing position where it is received inside the housing. The present invention is characterized by the loading mechanism of this disk player, namely, the carriage and transport means. The transport means is composed of carriage moving means, operation control means, and drive force imparting means.

The carriage moving means include support members mounted on the sub-chassis in the player housing in such a way that they grip both lateral sides of the carriage. The support members are capable of moving not only in a forward direction (i.e., the direction in which they project from the housing) or in a backward direction (i.e., the direction in which they are accommodated in the housing), but also in the loading direction at a predetermined rearward position in the housing. The carriage is supported by the support members in such a way that it is freely movable in forward and backward directions and is accelerated by accelerating means on the support members when they are moving in the forward or backward direction, whereby the carriage is lowered together with the support members when they move in the loading direction.

The operation control means is so constructed that the driving force from the drive force imparting means is divided by the operational control means into a driving force for causing the support members to be moved in forward or backward directions and in the loading direction, the driving force for the accelerating means, and the driving force for the clamping mechanism. The operation control means also serves to control the movement of the carriage.

The third component of the transport means, namely, the drive force imparting means, transmits the driving force of a drive source to the operation control means.

In the loading mechanism of the present invention employing the transport means that is basically composed of the above-mentioned three constituent elements, the support means for the chassis have a stopper with which the carriage comes into contact when the disk type recording medium held on the carriage reaches a predetermined recording or reproducing position. The accelerating means is provided with energizing means that imparts an energizing force, at least at the time when the accelerating means is driven in the direction in which the carriage is to be accommodated in the housing. The operation control means is arranged in such a way that the driving force it imparts to the support members for causing their movement in the forward or backward direction and the driving force it also imparts to the accelerating means are continuously applied until a short time after the carriage contacts the stopper, the operation control means imparting the necessary driving force to the support members for causing their movement in the forward or backward direction until the carriage, which is moving backward at an accelerated speed, contacts the stopper and the disk placed on the carriage is held at a predetermined position. Any further driving force is absorbed by the energizing means so as to merely urge the carriage against the stopper.

In further embodiments of the present invention, the transport means may be constructed as follows:

The carriage moving means is composed of support members that are mounted on the sub-chassis in such a way that they are capable of both movement in the forward and backward directions and movement in the loading direction. The carriage is mounted on the support members in such a way that it is capable of both accelerated movement in the forward or backward direction and movement in the loading direction. A rack member is disposed parallel to the direction in which the carriage moves. An accelerating gear (accelerating means or mechanism) meshes with the rack member and is also disposed parallel to the direction in which the carriage moves.

The operation control means is composed of an intermediate operational substrate that meshes with the accelerating gear in such a way that it imparts a drive force to the latter, and an operational substrate that imparts to the support members three different forces, one actuating both movement in the forward or backward direction and a movement in the loading direction, another for driving the accelerating mechanism, and the other for driving a clamping mechanism. The operation control means also controls the movement of the carriage.

The drive force imparting means is composed of a drive gear that transmits a drive force from a motor (i.e., drive source) to the operational substrate.

The support members are provided with a stopper which is disposed at such a position that the carriage will contact it when the carriage, moving backward (in the direction in which the carriage is to be accommodated in the housing) at an accelerated speed, catches up with the support members and establishes a predetermined positional relationship with the latter.

The accelerating gear is provided with energizing means that imparts an energizing force at least at the time when the accelerating gear is driven in such a direction that the carriage is moving into the housing.

The operational substrate is arranged in such a way that the drive force it imparts for moving the support members in the forward or backward direction and the drive force it also imparts to the accelerating means are continuously applied until a short time after the carriage contacts the stopper. The carriage, moving backward (in the direction in which the carriage is accommodated in the housing) at an accelerated speed, makes direct contact with the stopper on the chassis. Alternatively, the stopper can be constructed such that the carriage can catch up with the support members also moving backward and contact the stopper on the latter. In either case, the carriage establishes a predetermined positional relationship with the chassis (or support members) a short time before the drive force imparted to the support members by the operational substrate for causing them to move in the forward or backward direction reaches its limit. Hence, any extra drive force that is subsequently imparted for urging the support members in the forward or backward direction will be absorbed by the energizing means on the accelerating gear to cause the carriage to be merely urged against the stopper.

In still another embodiment of the present invention, the accelerating means is composed of one or more sets of double gearing.

If desired, the operation control means may be composed of a single operational substrate provided with a first drive rack that receives the driving force from the drive force imparting means, and a second drive rack that imparts a driving force to the accelerating gear wheel. Alternatively, the operation control means may be formed of an operational substrate and an intermediate operational substrate, which move in operative association with each other. The operational substrate is provided with a first drive rack that meshes with the drive gear coupled to the drive source, and the intermediate operational substrate is provided with a second drive gear that meshes with the accelerating gear so as to effect relative movement between said operational substrate and the accelerating gear wheel.

Having the construction described above, the transport means of the present invention performs the following operations.

When the user starts the drive source so as to move the operation control means in the forward direction, the carriage moving means causes the support member to be moved in the forward direction (in the direction in which it projects from the housing), thereby actuating the accelerating means so that the carriage is accelerated in the forward direction. The recording disk is then loaded and held in position on the carriage as it projects to the outside of the player housing. Subsequently, the drive source is re-started so as to move the operation control means, but this time in the backward direction (i.e., in the direction in which the carriage is accommodated in the housing). As a result, the carriage moving means causes the support member to be moved in the backward direction, thereby actuating the accelerating means so that the carriage is accelerated in the direction in which it is accommodated in the housing.

According to the present invention, the carriage which has been moved to an accelerated speed is moved in the loading direction in operative association with the playing means. To achieve this operative association, the position of the carriage must be properly determined before the movement of the carriage in the loading direction is started. The following two methods are available for this purpose:

In the first method, the carriage is brought into contact with a stopper on the chassis, and, by controlling its position with respect to the chassis, the carriage is brought into operative association with the playing means mounted on the chassis.

The second method is based on the fact that the carriage, as it is accelerated to move backward (i.e., in the direction in which it is accommodated in the housing), will catch up with and move ahead of the support member moving more slowly in the same direction. According to the second method, the carriage contacts a stopper on the support member at a point in time when a predetermined positional relationship is established between the two members so that the carriage is appropriately controlled in position with respect to the support member.

In short, the first method is direct in that the position of the moving carriage is determined with respect to the fixed immovable chassis, whereas the second method is indirect in that the movement and position are controlled by restraining the positions of the carriage while it is moving at an accelerated speed and the support member which is moving either forwardly or backwardly at a normal (unaccelerated) speed.

According to the present invention, the operation control means is designed so that the range over which the drive force for allowing the carriage to be moved in the forward or backward direction and the range over which the drive force is to be transmitted to the accelerating means are preliminarily determined. By taking advantage of this fact, the range over which these two drive forces act in the present invention is set in such a way that they will be imparted until a short time after the carriage has contacted the stopper. The extra force caused by continued driving is absorbed by the energizing means so that the carriage is merely urged against the stopper. As a result, the carriage and the support member which were moving in the forward or backward direction will start to move in unison in the loading direction while an appropriate positional relationship is maintained therebetween.

More specifically, the extra drive force that is continuously applied will act to cause a further movement of the carriage in the backward direction, but such movement of the carriage is inhibited by the stopper. The resulting extra drive force is absorbed by the energizing means, which also absorbs the play between the adjacent components, eliminating backlash and any residual drive force. The energizing means creates a force that allows the carriage to remain urged against the stopper. In this way, the carriage maintains an accurate positional relationship with the support member so as to ensure that the former is properly positioned while it is accommodated in the housing.

DESCRIPTION OF THE PREFERRED EMBODIMENTS

The present invention will hereinafter be described with reference to preferred embodiments shown in the accompanying drawings.

Figure 1:
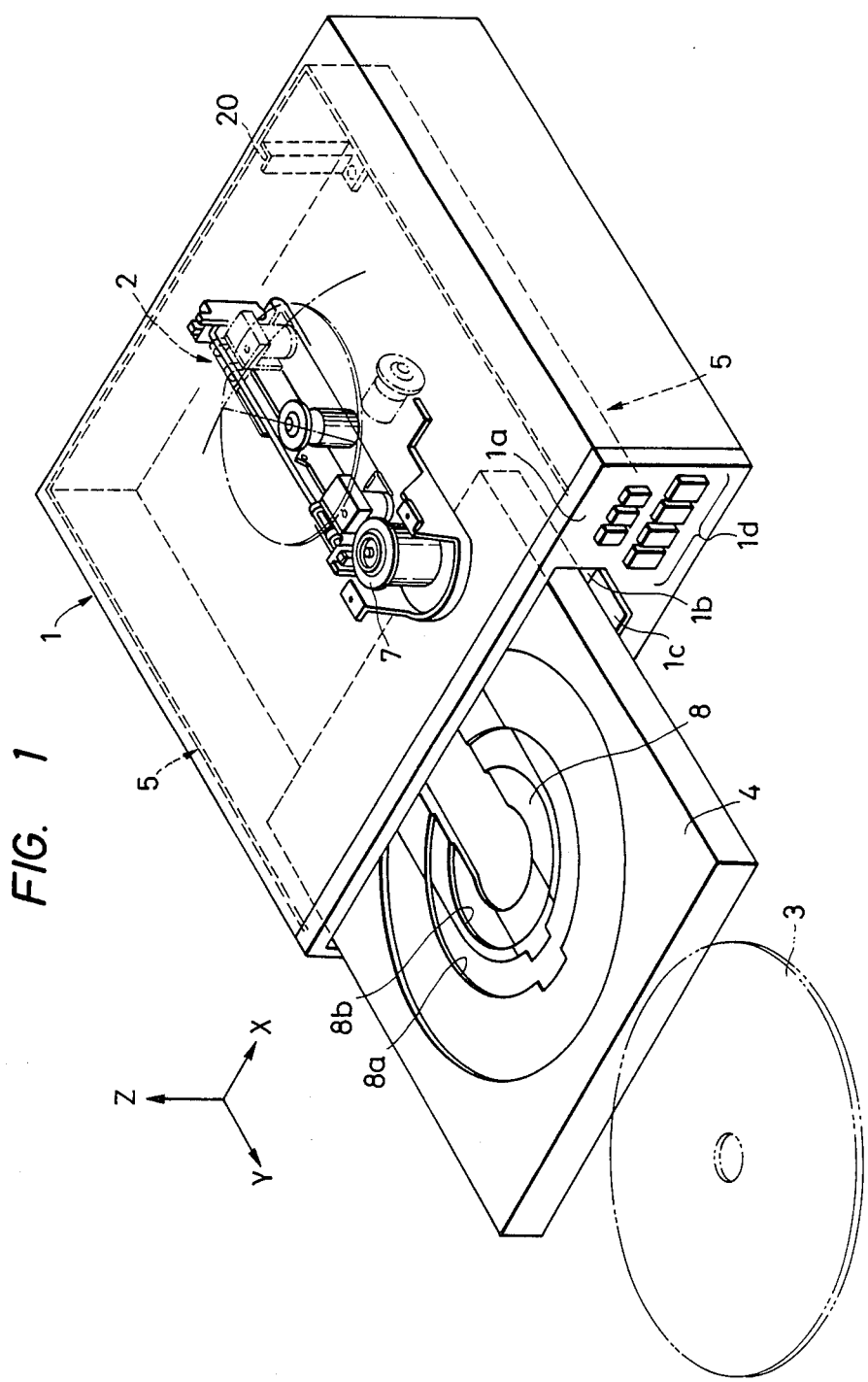
FIG. 1 is a perspective view showing the general layout of a front loading disk type recording medium player employing a loading mechanism of the present invention.
Figure 2:
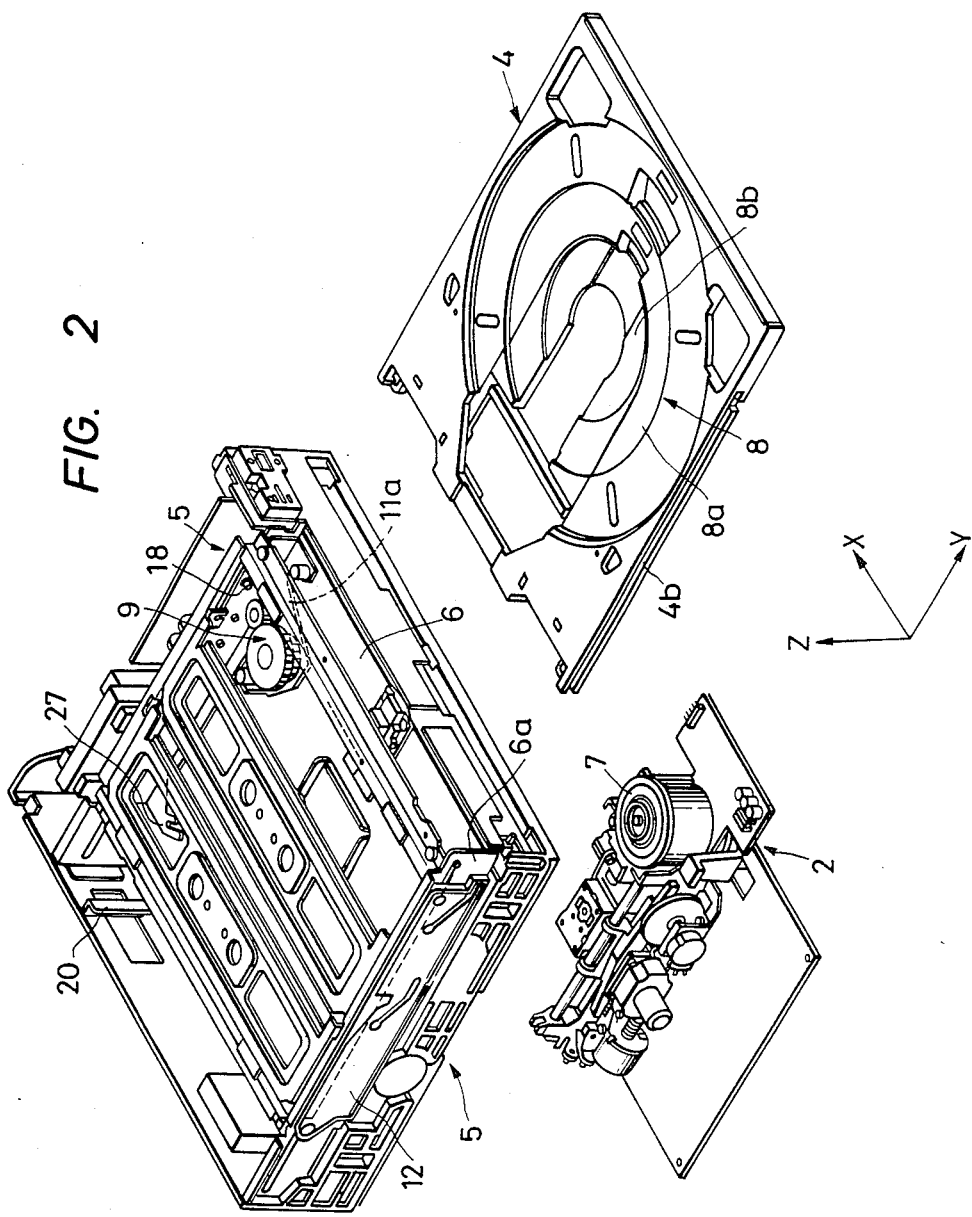
FIG. 2 is a perspective view showing the general layout of the loading mechanism and the playing mechanism.

FIG. 1 shows a schematically the general layout of a disk player employing the inventive front loading system, and FIG. 2 is a perspective view showing part of a loading mechanism employed in that disk player.

The disk player 1 is basically composed of a player housing 1, a playing mechanism 2 installed in the housing 1, a carriage 4 that holds, guides and transports a disk type recording medium 3, and a transport mechanism 5 that allows the carriage 4 either to move to a disk unloading position where it projects from the housing 1 or to a recording or reproducing position where it is accomodate inside the housing 1.

As shown in FIG. 1, the player housing 1 has a box-shaped form and includes a front panel 1a on its front face that is provided with a horizontally extending rectangular opening 1b. The carriage 4 supporting the medium 3 to be played can project to the outside of the housing 1 through the opening 1b. In the neighborhood of this opening 1b, a door 1c in a sheet form is provided which closes the opening 1b after the carriage is accommodated in the housing. The front panel 1a is also provided with a group of switches 1d which are manipulated to operate the disk player.

It is assumed that forward, leftward and upward directions are indicated by the directions or arrows X, Y and Z, respectively. This assumption shall apply in the following description of the present invention.

As shown in FIGS. 1 and 2, a chassis 6 made of a steel plate is installed in the player housing 1, and a playing mechanism 2, a carriage 4, and a transport mechanism 5 are mounted on the chassis 6. The playing mechanism 2 is basically composed of a turntable 7 for supporting the disk type recording medium 3, a mechanism that automatically starts, drives and stops the medium 3 on the turntable 7, and a converter for recording or reproducing information from the recording medium. The carriage 4 holds, guides and transports the medium 3 to be played, and the transport mechanism 5 moves the carriage between a medium unloading position where the carriage 4 projects from the player housing 1 and a recording or reproducing position inside the housing 1.

The present invention is basically directed to an improvement of the loading mechanism, namely, the transport mechanism, in such a front loading disk player.

The transport mechanism 5 in the embodiment under discussion has been developed to meet the requirements for a minimum number of parts and for a smaller overall size that is attained by minimizing the overall dimensions. The principal design conditions which were taken into account were as follows: a single motor is used as the drive source; the various actions involved in the loading operation are centralized in the forward or backward movement of the operation control member installed on the chassis; and this movement of the operation control member will in no case exceed the depth of the chassis.

The maximum distance that is traveled by the forward or backward movement of the operation control member is determined by the following criterion: (the depth of housing divided by two)−(distance obtained by projecting the inclined hole in the operation control member onto a horizontal plane). The housing of commercial disk players has an approximate depth of 40 cm. Hence, by subtracting the necessary horizontal projection distance, which is 2–3 cm, from half the depth of the housing, the distance over which the operation control member can be moved either in the forward or backward direction is calculated to be about 18 cm.

Although the operation control member is restricted to move through only such a short distance, it is necessary that the various actions involved in the loading operation, e.g., projecting the carriage from the housing, accommodating the carriage in the housing, and lowering and clamping the carriage, be performed within this limited distance.

The loading mechanism (i.e., transport mechanism) of the disk player will hereinafter be described in greater detail.

The transport mechanism 5 is composed of the carriage 4, the carriage moving mechanism, the operation control member, and the drive force imparting mechanism. The carriage moving mechanism includes a support member 11 that is mounted on the chassis 6 in such a way that it is capable of both movement in the forward and backward directions and movement in the loading direction. The carriage 4 is mounted on the support member 11 in such a way that it is capable of both an accelerated movement in the forward or backward direction and a movement in the loading direction. A rack member 1a is disposed parallel to the direction in which the carriage 4 moves. An accelerating gear 9 (accelerating mechanism) meshes with the rack member 4a and is disposed parallel to the direction in which the carriage 4 moves.

Figure 5:
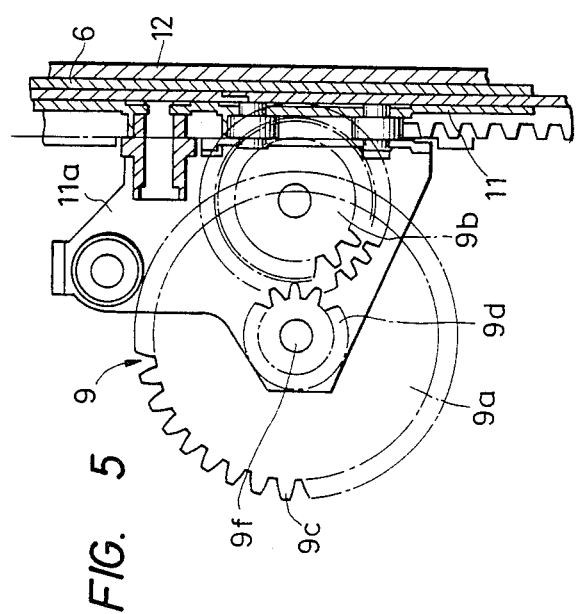
FIG. 5 is a plan view of an accelerating mechanism.
Figure 7A:
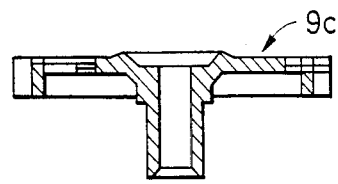
FIGS. 7A to 9B show the components of a double gear in an unassembled state, of which the "A" figures are cross-sectional views and the "B" figures plan views.
Figure 7B:
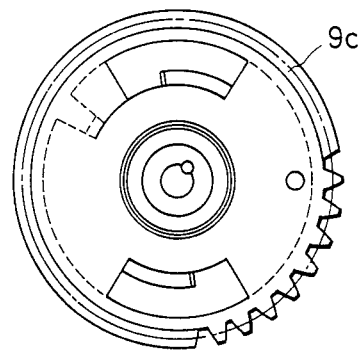
Figure 8A:
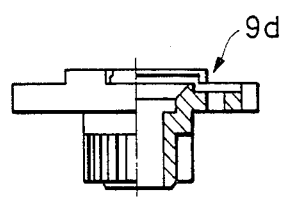
Figure 8B:
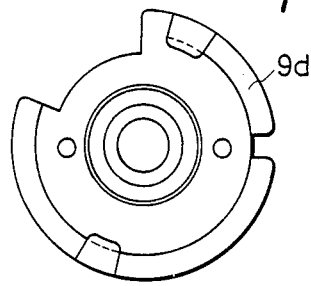
Figure 9A:
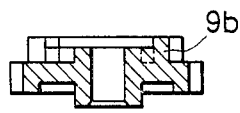
Figure 9B:
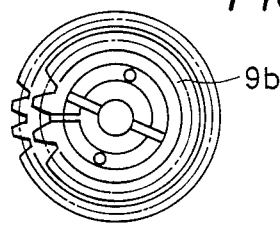

The details of the accelerating gear 9 are shown in FIGS. 5 et seq.

The operation control member is composed of an intermediate operational substrate 13 that meshes with the accelerating gear 9 in such a way that it imparts a drive force to the latter, and an operational substrate 12 that imparts to the support member 11 three different drive forces, namely, one for actuating both movement in the forward or backward direction and movement in the loading direction, another for driving the accelerating mechanism, and the other for driving the clamp mechanism, and which also controls the movements of the carriage 4. The drive force imparting mechanism is composed of a drive gear that transmits a drive force from the motor (i.e., drive source) to the operational substrate 12.

The chassis 6 is provided with a stopper 20 which comes in contact with the carriage 4 when the disk type medium reaches a predetermined position. The accelerating gear 9 is provided with an energizing device 9e such as a spring that imparts an energizing force at least at the time when the gear 9 is driven in such a direction that the carriage is moved into the housing. The operational substrate 12 is arranged in such a way that the drive force it imparts for moving the support member 11 in the forward or backward direction and the drive force it also imparts to the accelerating mechanism are continuously applied until a short time after the carriage 4 contacts the stopper 20. With this arrangement, the carriage 4 will contact the stopper 20 and establish a predetermined positional relationship with the chassis 6 a short time before the drive force imparted to the support member 11 by the operational substrate 12 for effecting its movement in the forward or backward direction reaches its limit. Any further drive force that is subsequently imparted which urges the support member 11 in the forward or backward direction will be absorbed by the energizing device 9e on the accelerating gear 9. The carriage 4, urged against the stopper 20, will hence maintain the appropriate positional relationship with the latter so that the two members, which were moving in the forward or backward direction, will start to move in unison in the loading direction while the desired relationship is maintained therebetween.

Alternatively, the stopper 20 may be disposed on the support member 11. In this case, the carriage 4 which is moved at an accelerated speed in the backward direction (i.e., in the direction in which the carriage is accommodated in the housing) will catch up with the support member 11. When a predetermined positional relationship is established between the carriage 4 and the support member 11, the carriage will contact the stopper so as to maintain the predetermined positional relationship with the support member 11.

The constituent elements of the transport means are hereinafter described in detail.

First, one of the basic components of the transport mechanism is the carriage 4. As shown in FIGS. 1 and 2, the carriage 4 is formed from a thin sheet or disk that has on its top surface a recording medium holding area 8 in which either one of two optical video disk type recording media, having respective diameters of about 30 and 20 cm, can be received. In the embodiment shown, the area 8 is formed of two concentric circular shallow recesses 8a and 8b. However, the area 8 may be in the form of one circular shallow recess 8a with predetermined dimensions, which is combined with a larger and a smaller disk guide made from a separate member.

In the embodiment shown, the carriage 4 has a rack member 4a that is formed on its reverse surface in the neighborhood of the lateral side and which runs parallel to the direction in which the carriage 4 is to move. The carriage also has a guide groove 4b formed on both of its lateral edges and which runs parallel to the direction in which the carriage 4 moves. The grooves 4b guide the carriage 4 in such a way that it moves as it is supported by the grooves.

The arrangement for holding the carriage 4 in the housing 1 and the arrangement for allowing the carriage 4 to be moved either in the forward or backward direction will be described hereinafter.

The carriage 4 is held by a pair of support members 11 mounted on the sub-chassis 6a in such a way that they grip both lateral sides of the carriage. The carriage 4 is supported in a direction parallel to the disk type recording medium supporting surface 7a of the turntable 7 (see FIG. 10) by means of roller pins 18 and guide pins 19 (see FIGS. 13 and 14) that project inwardly from the support members 11 on both lateral sides of the carriage. The pins 18 are fitted into the guide grooves 4b on both lateral edges of the carriage 4 in such a way that they are movable in the direction in which the carriage 4 projects and retracts. In the case of the embodiment shown, this is in the forward direction (as indicated by the arrow Y) or backward direction (opposite to the direction indicated by the arrow Y).

Figure 3:
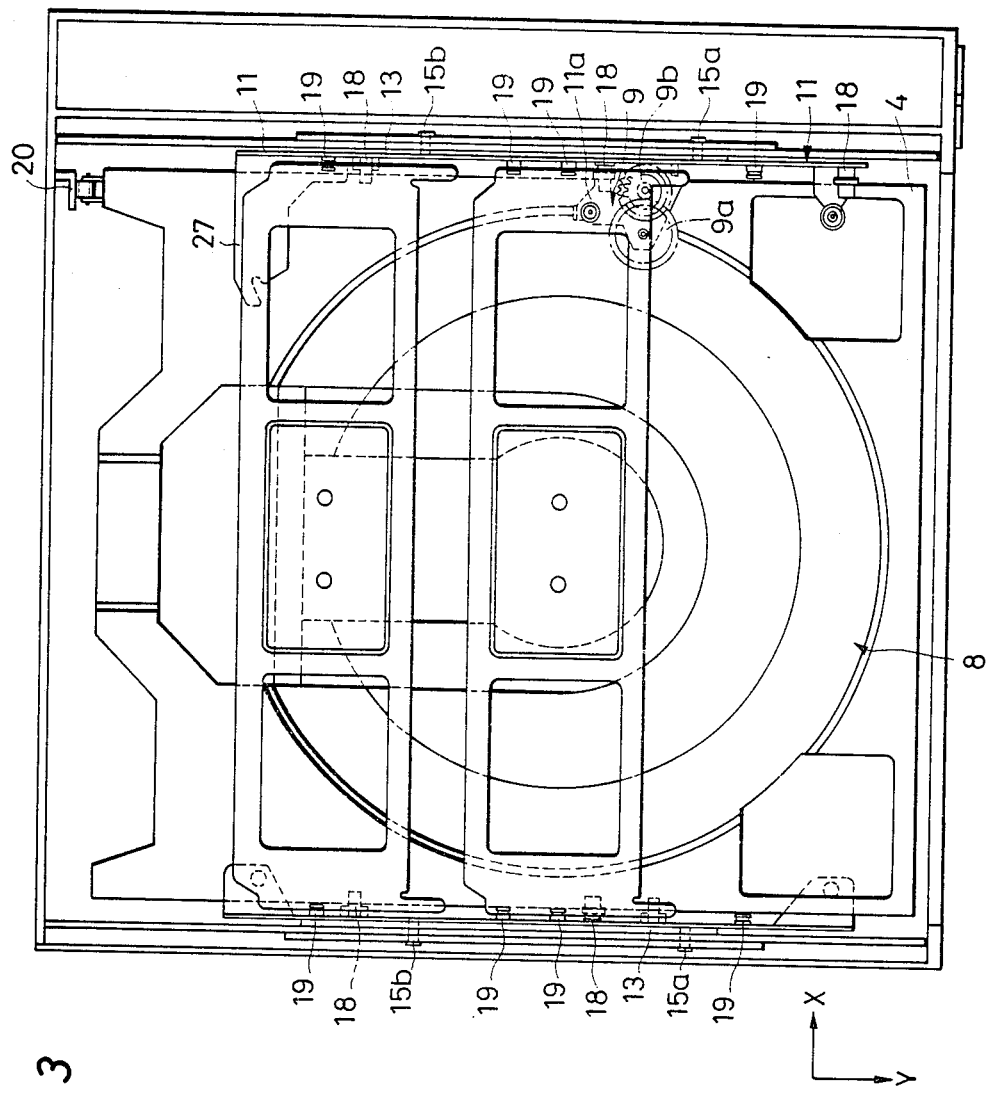
FIG. 3 is a plan view of the loading mechanism.
Figure 4:
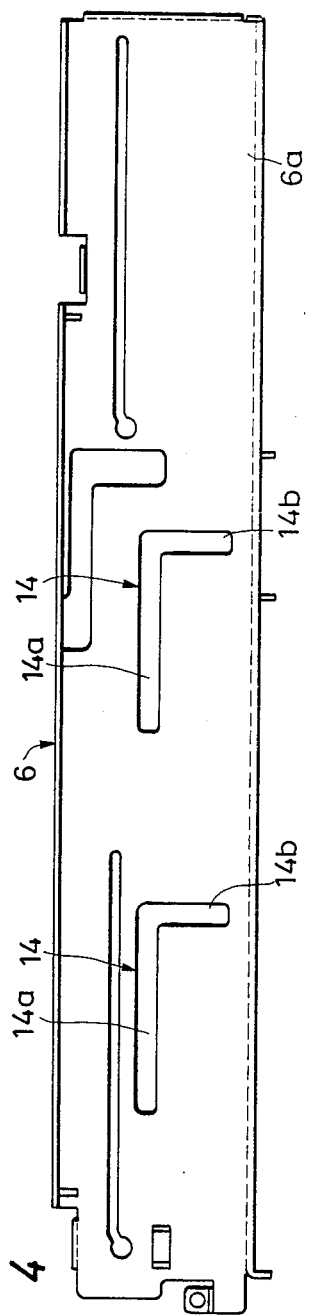
FIG. 4 is a side view of a sub-chassis.
Figure 6:
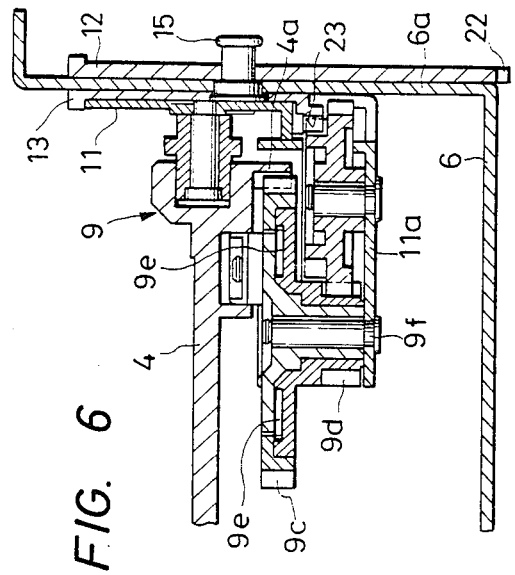
FIG. 6 is an elevational side view of the accelerating mechanism shown in section.

As shown in FIGS. 3, 5 and 6, the carriage moving mechanism is constructed so that the rack member 4a provided on the reverse surface of the carriage 4 in the neighborhood of the lateral side will mesh with the accelerating gear 9 (in the case of the embodiment shown, the gear 9a of a first double gear equipped with an energizing device) that is disposed on the bracket member 11a of the support member 11. Therefore, if the gear 9 (i.e., the gear 9a of the first double gear mechanism) is rotated in either the forward or reverse direction, the rack member 4a with which it meshes will allow the carriage 4 to be moved at an accelerated speed in the forward or backward direction.

Subsequently, the chassis, which is one of the principal constituent elements of the carriage moving mechanism, will be described.

Figure 11:
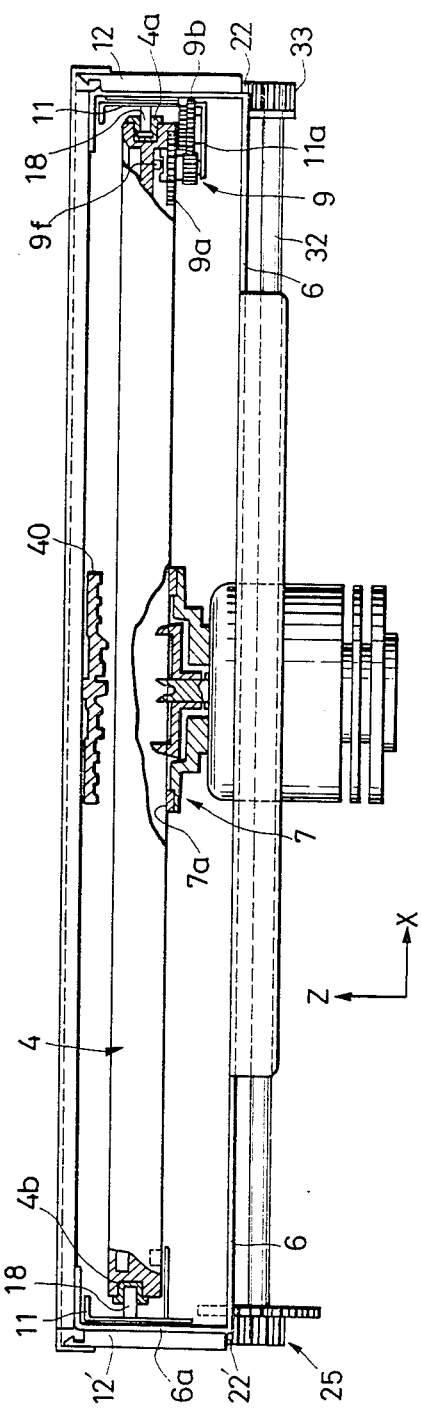
FIG. 11 shows in detail part of the internal structure of the player housing.
Figure 12:
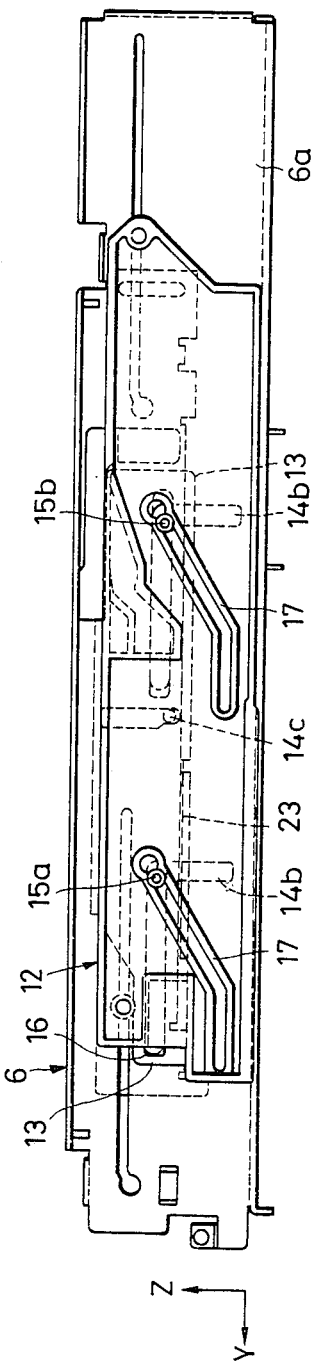
FIGS. 12 and 13 are side views showing the operational state of a carriage transport assembly.

As shown in FIGS. 3, 11 and 12, the chassis 6 provides a basic framework for supporting the necessary components in position. A sub-chassis 6a is formed as a rising or upright member on both lateral sides of the chassis 6. Each of the sub-chassis 6a is formed as a sideboard that rises from the chassis 6 along the inside of both lateral surfaces of the player housing 1 and which is provided with two L-shaped guide slots 14, one being positioned forwardly of the other and spaced therefrom at a given interval. Each of these guide slots, which engage almost all members of the loading mechanism and hence control the basic operations of such members, consists of a horizontal portion 14a that extends parallel to the longitudinal direction of the sub-chassis and a bent portion 14b that continues from the rear end of the portion 14a and which extends in the loading direction (downward in the case of the embodiment shown). As shown, an engaging projection 14c is disposed at the center of the inside surface of each sub-chassis for attaining engagement with an intermediate operation substrate 13 (described in detail below).

The support member 11, which is another principal constituent element of the carriage moving mechanism, will now be described.

Figure 15:
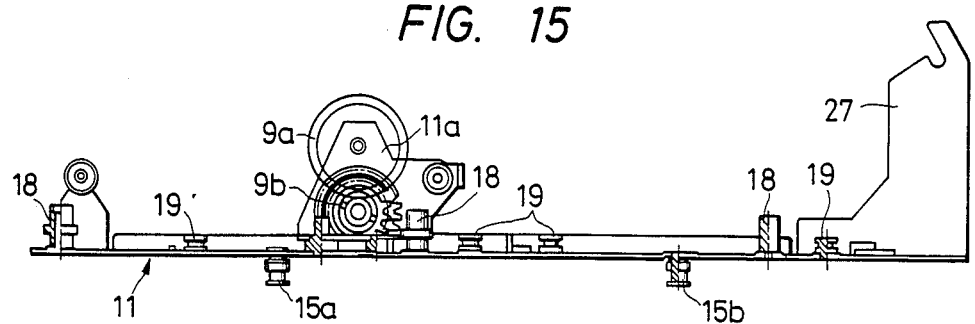
FIGS. 15 and 16 are a plan view and a side view, respectively, of a support member.
Figure 16:
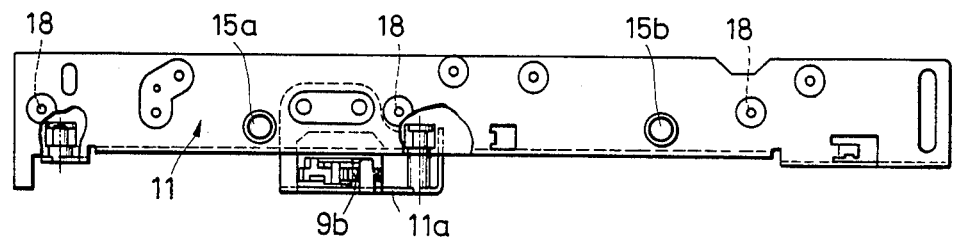

As shown in FIGS. 15 and 16, the support member 11 is formed of a rectangular steel sheet. Its outer surface of its lateral side is provided with two roller pins 15a and 15b that project outwardly, one roller pin being disposed forwardly of the other and spaced therefrom at a given interval. These roller pins 15a and 15b are provided at positions that correspond, respectively, to the two L-shaped guide slots 14 in the sub-chassis 6a, two horizontal guide slots 16 in an intermediate operational substrate 13 (described in detail below), and two cam slots 17 in an operational substrate 12 (also described below in detail). The roller pins are simultaneously inserted into the slots 14, 16 and 17. In other words, the support member 11 is mounted on the sub-chassis 6a in such a way that it is freely movable along the L-shaped guide slots 14 by means of the roller pins 15a and 15b.

The inside surface of the lateral side of the support member 11 is provided with a plurality of roller pins 18 and guide pins for movably supporting the carriage 4 that project inwardly and which are spaced at a given interval.

One of the support members 11 is further provided with a bracket member 11a at its lower inside portion. Two sets of double gears 9a and 9b that mesh with each other and move in operative association are provided on the bracket member 11a in such a way as to effect an accelerating action. A sub-carriage locking member 27 is formed at the rear portion of the support member 11.

A pair of support members 11, one being provided with the accelerating mechanism 9 and the other having no such member, are mounted inwardly of the sub-chassis in such a way that they are freely movable along the L-shaped guide slots by means of roller pins 15a and 5b.

The double-speed mechanism mounted on the support member 11 is still another principal constituent element of the carriage moving mechanism and will now be described in detail.

In the embodiment shown in FIGS. 2, 3, 5 6 and 15, the accelerating mechanism is provided on one of the support members 11 slidably mounted on the chassis 6. The inwardly projecting bracket member 11a is formed on one of these support member 11, and two sets of double gears, 9a (the first double gear) and 9b (the second double gear) that mesh with each other and move in operative association are provided on the bracket member 11a in such a way as to effect an accelerating action. Stated more specifically, as shown in FIGS. 5 and 6, the first double gear 9a meshes with the rack member 4a extending parallel to the direction which the carriage 4 is to move, and the pinion meshes with the gear of the second double gear 9b, the pinion of which meshes with an intermediate drive rack 23 in the intermediate operational substrate 13 (described below in detail).

As shown in FIGS. 7A-9B the first double gear 9a consists of a gear 9c and a pinion 9d that are separate members mounted on a common axis-forming pin 9f, with an energizing device 9e being provided therebetween for imparting an energizing force when the gear 9a is rotated at least in the direction in which the carriage is moved toward being accommodated in the housing. Although not shown, the energizing device 9e may be mounted on the second double gear, rather than the first double gear.

In short, the accelerating mechanism is composed of the rack member 4a on the carriage 4, the accelerating gear 9 having of two sets of double gears 9a and 9b, the intermediate drive rack 23, and a first drive rack 22 that moves relative to the rack 23. The ratio of the speed of the operational substrate 12 to that of the carriage 4 is determined by the number of teeth on the two sets of double gears 9a and 9b, and is approximately 1:4 in the case of the preferred embodiment.

By means of the arrangement described above, the carriage 4 is allowed to move at a speed which is a given multiple of the speed at which the operational substrate 12 moves.

The use of the combination of the accelerating gear 9 and the rack member 4a in the accelerating mechanism offers the advantage that the speed of the carriage 4 relative to the operational substrate 12 can be readily set with a simple structure.

The third of the basic constituent elements of the transport mechanism is the operation control member.

Figure 19:
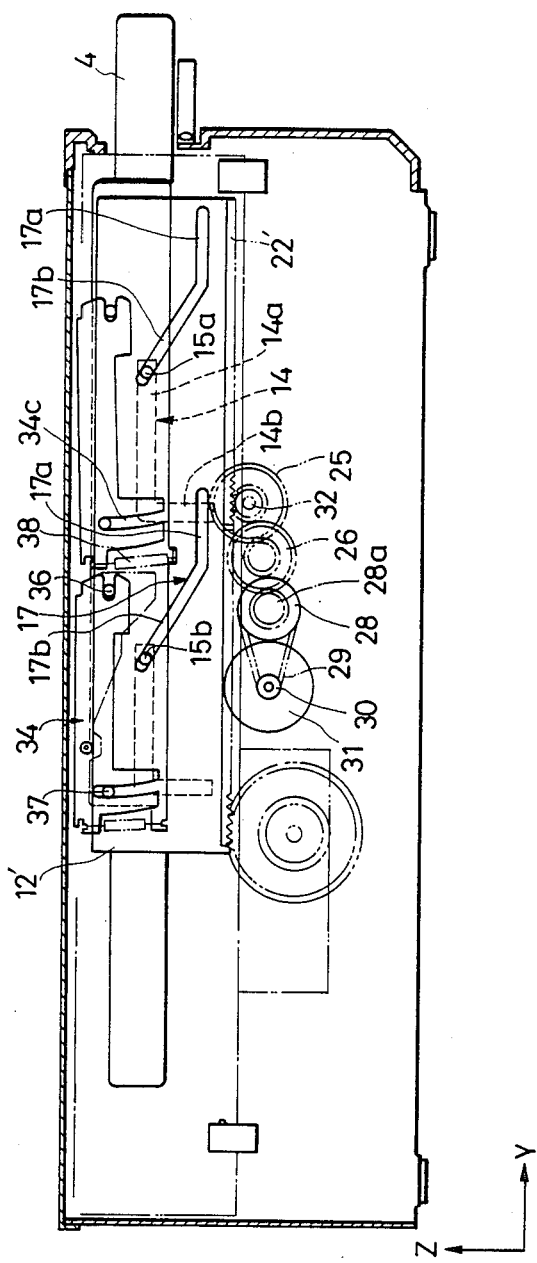
FIG. 19 is a side view of a drive force imparting mechanism.

In the embodiment shown, the operation control member is formed of two elements, namely, the operational substrate 12 (FIG. 14) and the intermediate operational substrate 13 (FIG. 19). The following description concerns these elements.

Figure 14:
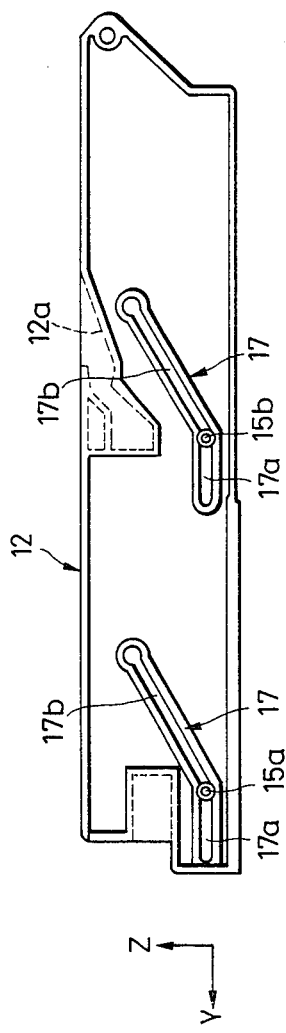
FIG. 14 is a side view of an operational substrate.

As shown in FIG. 14, the operational substrate 12 is formed from a rectangular sheet of material and has two cams slots 17 in the surface of its lateral side, one slot being forward of the other and spaced therefrom at a given interval. The cam slots are formed at positions that correspond to the roller pins 15a and 15b on the support member 11. As is clear from FIG. 14, each of the cam slots 17 consists of a horizontal portion 17a and an inclined portion 17b that continues from the rear end of the portion 17a and which is inclined backwardly (opposite to the direction indicated by the arrow Y) and upwardly (in the direction indicated by the arrow Z). The operational substrate 12 is provided with a downwardly facing first drive rack 22 along its lower edge. In FIG. 15, a guide cam member for restricting the operation of the clamper is denoted by 12a.

The operational substrate 12 is mounted outside of the pair of sub-chassis 6a in such a way that it is movable in the forward or backward direction by means of roller pins 18 that project from each of the support members 11 and which are spaced in such a way that one roller pin is positioned forwardly of the other.

Figure 17:
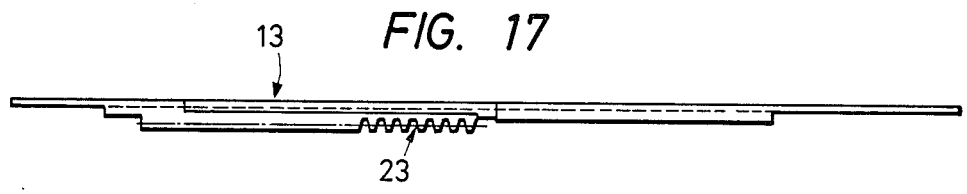
FIGS. 17 and 18 are a plan and a side view, respectively, of an intermediate operating substrate.
Figure 18:
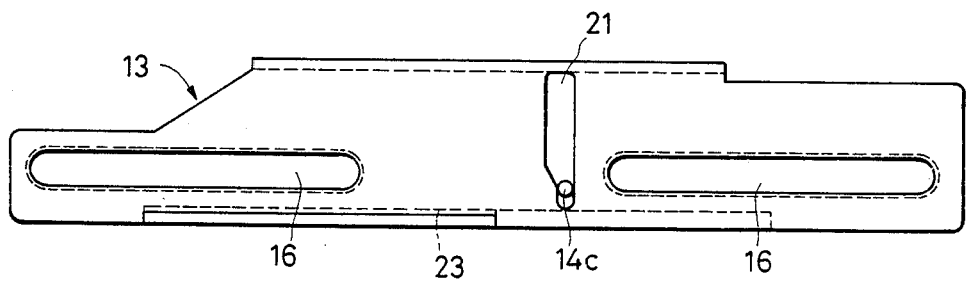

As shown in FIGS. 17 and 18, the intermediate operational substrate 13 is formed of a rectangular sheet material that extends in the forward and backward directions and which has a pair of guide slots 16 in the surface of its lateral side that extend in the forward and backward directions (i.e., in the direction indicated by the arrow Y and in the opposite direction). An elongated vertical guide slot 21 is formed in substantially the central portion of the substrate 13 in the loading direction. (This direction is vertical in the case of the embodiment shown).

The intermediate operational substrate 13 is mounted inside of both sub-chassis 6a in such a way that the pins 18 which project inwardly from the sub-chassis 6a are inserted into the loading guide slots 21 while the guide pins 19 on the support member penetrate through the guide slots 16. In other words, the intermediate operational substrate 13 is mounted in such a way that it is movable only in the vertical direction while it is held between the inside surface of the sub-chassis 6a and the outside surface of the support member 11. One of these pair of members, in particular, the substrate 13 associated with the support member 11 having the accelerating gear 9, is additionally provided at its lower portion with an intermediate drive rack 23 that projects inwardly and which extends in the longitudinal direction of the substrate 13. This intermediate drive rack 23 meshes with the pinion of the accelerating gear 9 when it is mounted on the sub-chassis 6a.

As described above, the operational substrates 12 and 13 used in the embodiment under discussion are formed as two separate members, the former being provided with the first drive rack 22 while the latter is provided with the intermediate drive rack 23. The first drive rack 22 receives the drive force imparted by the drive source and causes the operational substrate 12 to move in the forward or backward direction. As a result of this movement of the operational substrate 12, drive forces are imparted that effect several actions, such as the movement of the support member in the forward or backward direction, the movement of the support member in the loading direction, a relative movement that actuates the accelerating mechanism, the accelerated movement of the carriage in the forward or backward direction, the positioning of the carriage, the lowering of the clamper, and the operation of the locking mechanism. In addition, these various actions are controlled in such away that they are properly timed. These are two major characteristic features of the loading mechanism of the present invention.

Stated more specifically, the forward or backward movement of the operational substrate 12 causes an operatively associated movement of the support member 11 in the forward or backward direction, whereupon the accelerating gear 9, which is integral with the support member, moves in the forward or backward direction. As a result, a relative movement is created with respect to the intermediate drive rack 23 on the intermediate operational substrate 13, which does not then move in the forward or backward direction. This relative movement imparts a rotational driving force to the accelerating gear 9. When the support member 11 has completed its movement in the backward direction, it changes its rotational direction so as to move in the loading direction at the rear position. The intermediate operational substrate 13 also changes directions and starts to move in the vertical direction.

The operational substrates 12 and 13 are formed as two separate members in order to attain the following two purposes: First the force that causes the operational substrate 12 to move in the forward or backward direction is converted to a driving force that rotates the accelerating gear 9. Secondly, because the intermediate operational substrate 13 allows only the movement of the support member 11 in the loading direction, the accelerating gear 9 will properly mesh with the intermediate drive rack 23 to ensure smooth operation of the loading mechanism.

It should, however, be noted that the operational substrates 12 and 13 need not always be formed as two separate members. If desired, these substrates may be formed as one member provided with both the first drive rack 22 and the intermediate drive rack 23. In this case, the mechanism of the drive source is so designed that it will follow two movements of the operational substrate 12, one being in the forward or backward direction and the other being in the loading direction.

Alternatively, the intermediate operational substrate 13 may be fixed to the sub-chassis 6a. In this case, the intermediate drive rack 23 formed on the intermediate operational substrate 13 should be wider than the range over which the accelerating gear 9 in mesh with the rack 23 is to move vertically together with the support member 11.

The fourth of the basic constituent elements of the transport mechanism is the drive force imparting mechanism, which will now be described in detail.

As shown in FIG. 19, the drive force imparting mechanism is composed of a motor 31 serving as the drive source, an intermediate transmission mechanism including a speed-changing intermediate drive gear and other necessary elements 16, 18, 19 and 30, a driving double gear 25 that converts the primary rotational driving force to the secondary driving force that causes the operational substrates 12 and 12' to move in the forward or backward direction, and a first drive rack 22.

That is, a pair of operational substrates 12 and 12', the former being provided on the right side and the latter on the left side, are respectively provided with first drive racks 22 and 22' at their lower ends, as shown in FIGS. 12, 15 and 20.

As shown in FIGS. 11 and 19, the pinion of the driving double gear 25 meshes with the first drive rack 22' formed on one of the two operational substrates (i.e., the left-hand substrate 12' in the depicted embodiment).

The driving double gear 25 is coupled to the output shaft of the motor 31 via a double gear 26, the pinion of which meshes with the gear of the double gear 25, a pulley 28 having as an integral part a third double gear 28a, the pinion of which meshes with the gear of the double gear 26, a belt 29, and a small pulley 30.

As is clear from FIG. 11, the double gear 25 is mounted at one end of a shaft 32 which has a gear 33 mounted at the other end. The gear 33 meshes with the first drive rack 22 formed on the other first operational substrate 12 disposed on the right side. In other words, the first operational substrates 12 and 12' are arranged so that they move in unison in response to the rotation of the motor 31.

The double gear wheels 25 and 26, the pulley 28, the belt 29, the small pulley 30, the motor 31, the shaft 32, and the gear 33 combine together to form a mechanism that imparts a driving force to the operational substrates 12 and 12'.

The clamp mechanism by which the disk type recording medium is clamped at the playing position, namely, on the turntable 7, will be described hereinafter with reference to FIGS. 1, 3, 10, 11 and 19.

Figure 10:
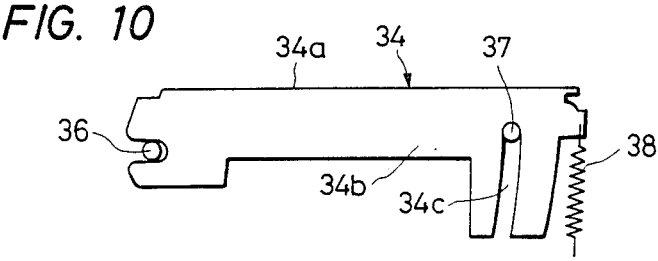
FIG. 10 is a side view of a clamper mechanism.

As shown in FIGS. 1 and 10, the player housing 1 contains in its interior a retaining member 34 composed of a planar portion 34a in a rectangular sheet form that extends in rightward and leftward directions, and an elevational portion 34b that is continuous to both ends of the planar portion 34a. As is clear from FIG. 19 and 10, the retaining member 34 is pivotally mounted on a pin 36 at the front end of the elevational portion 34b. The pin 36 is disposed so that it projects from the support member 11. This pin 36, which pivotally supports the retaining member 34, extends parallel to the recording medium supporting surface 7a of the turntable 7. Therefore, the retaining member 34 is swingable in an internal plane (in the direction indicated by an arrow s) perpendicular to the disk supporting surface 7a.

As shown in FIG. 10, a cutout 34c having a predetermined curvature is formed at the other end of the elevational portion 34b. The swinging movement of the retaining member 34 is guided by another pin 37 (also shown in FIG. 19) that slidably engages the cutout 34c. The pin 37 is also formed in such a way that it projects from the support member 11. As also shown in FIG. 10, the free end of the retaining member 34 is coupled to a coil spring 38 that energizes the free end toward the turntable 7. As shown in FIGS. 11 and 19, a depressing member 40 in a disk from that presses the disk type recording medium 3 (see FIG. 1) against the turntable 7 is rotatably mounted in the central area of the planar portion 34a of the retaining member 34.

The above-described retaining member 34, coil spring 38, and depressing member 40 combine together to form the clamp mechanism.

While the components of the loading mechanism of the present invention have been individually described above, it should be noted that all or part of these components are combined together as required and cooperate to achieve various actions such as allowing the carriage to project from or be accommodated in the housing, the positioning of the carriage, the movement of the carriage in the loading direction, and the clamping of the same. In other words, each of the components of the loading mechanism is multi-functional. It is therefore necessary to describe how the individual components are interrelated in their movements. Accordingly, there will now be described the accelerated movement of the carriage 4 in the forward or backward direction and how the carriage set in motion, the movement of the carriage in the loading direction and how it is set in motion, and the positions through which the carriage is moved.

First, the accelerated movement of the carriage 4 in the forward or backward direction and how the carriage is set in motion will be described with particular reference being made to the relative movement between the accelerating gear 9 that allows the carriage to move in the forward and backward directions (i.e., the direction indicated by the arrow Y and the opposite direction) and the intermediate drive rack 23 which imparts a rotational driving force to the gear 9.

The operational substrate employed in the embodiment shown is constructed so that two separate racks (the first drive rack 22 and the intermediate drive rack 23) move in operative association. The drive source 25 meshes with the first drive rack 22 while the intermediate drive rack 23 meshes with the accelerating gear 9 so as to produce indirectly a relative movement between the operational substrate 12 and the accelerating gear 9.

The operational substrate employed in the embodiment shown is constructed so that two separate racks (the first drive rack 22 and the intermediate drive rack 23) move in operative association. The drive source 25 meshes with the first drive rack 22 while the intermediate drive rack 23 meshes with the accelerating gear 9 so as to produce indirectly a relative movement between the operational substrate 12 and the accelerating gear 9.

As already mentioned, the accelerating gear 9 is mounted on the support member 11, and the roller pins 15 that project outwardly from the support member 11 are fitted simultaneously into the L-shaped guide slots 14 in the sub-chassis 6a, guide slots 16 in the intermediate operational substrate 13, and cams slots 17 in the operational substrate 12, with the result that the movement of the pins 15 is restricted. If, under these conditions, the operational substrate 12 is moved in the forward or backward direction, the above-mentioned members will be operated in the manner described below, and the intermediate drive rack 23 will undergo a relative movement with respect to the accelerating gear 9. The forward movement of the operational substrate 12 is identical to its backward movement, except that the resulting movement of the respective members is reversed. Therefore, the following description is only directed to the movement of the relevant members that occurs when the operational substrate 12 is moved from its most forward position towards backward position.

Figure 13:
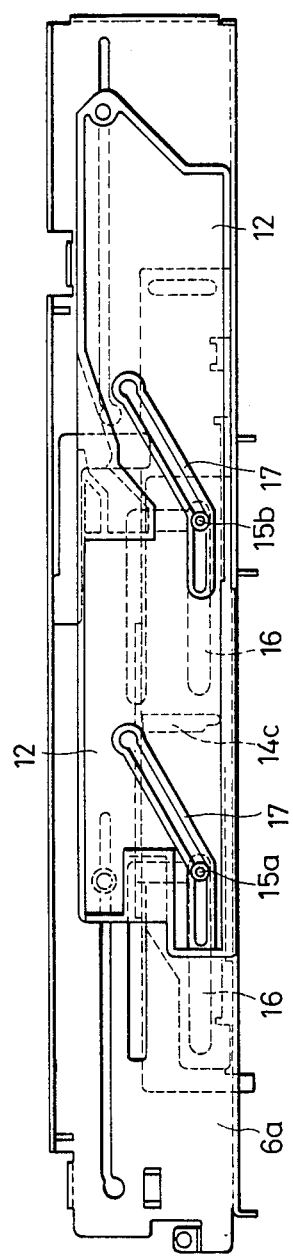

As shown in FIG. 13 when the operational substrate 12 is at the most forward position, it moves in operative association with the support member 11 by roller pins 15, and these two members (11 and 12) are allowed to move backward (opposite to the direction indicated by the arrow Y) as they are restricted by the front and rear ends of the L-shaped guides slots 14 in the sub-chassis 6a. In this case, the force that causes the intermediate operational substrate 13 to move in the forward or backward direction is released by way of the guide slots 16. In addition, it engages the guide pin 14c that is fitted into the central guide slot 21. Because of these two factors, the intermediate operational substrate 13 will stand still and not move. Therefore, relative movement is produced between the accelerating gear 9 on the support member 11 which moves forward or backward together with the operational substrate 12 and the intermediate drive rack 23 on the immobile intermediate operational substrate 13. This relative movement is continued until the roller pins moved by the operational substrate 12 reach the most backward end of the guide slots 16 in the intermediate operational substrate 13, as shown in FIG. 13. As long as this relative movement is taking place, the carriage 4 is moved at an accelerated speed toward the position where it is accommodated in the housing 1.

The movement of the carriage 4 in the loading direction to load and clamp the disk type recording medium 3 held on the carriage 4 on the turntable 7 will now be described.

Basically, this operation is performed by further continuing the already described backward movement of the operational substrate 12. Stated more specifically, the roller pins 15 integral with the support member 11 will stop moving in the forward or backward direction since they are restricted by the bent portion 14a of each of the L-shaped guide slots 14 in the sub-chassis 6a and by the rear end of each of the guide slots 16 in the intermediate operational substrate 13. On the other hand, the support member 11 and the intermediate operational substrate 13 move together downwardly in the loading direction. In this case, the force necessary to move the support member 11 and the carriage 4 supported thereby in the loading direction is imparted by the roller pins 15, which are guided downward along the cam slots 17 in the operational substrates 12 and 12' as they move in the backward direction. As shown in FIG. 13, this movement in the loading direction takes place during an interval not exceeding the time when the roller pins 5 descend to the lower end of each of the cam slots 17 in the operational substrates 12 and 12'.

If disk type recording media of two different diameters are to be transported on the same carriage 4, somewhat longer cam slots 17 are formed as shown in FIGS. 12 and 13. In addition, if the first operational substrate 12 is moved backward along the horizontal portion of each of the cam slots 17, the medium of the smaller diameter on the carriage 4 will be transported backwardly and loaded on the backward second turntable 7a, whereupon the associated clamper 40a is moved in the loading direction so as to hold the medium of the smaller diameter at the position where conversion is made from the recording mode to the reproducing mode.

Thirdly, the mechanism for specifying the position to which the disk type recording medium 3 is to be transported when the carriage 4 is accommodated in the housing will be discussed.

As described previously, the first characteristic feature of this mechanism is that the double gear 9b of the accelerating gear 9 is provided with the spring 9e which produces an energizing force when this gear is rotated in the direction which causes the carriage to be moved into the housing (i.e., opposite the direction indicated by the arrow Y). In other words, as shown in FIGS. 5 and 6, the double gear 9a is composed of a gear and a pinion that are separate members mounted on the same axis-forming pin 9f, and the spring 9e, which imparts an energizing force at least at the time the gear 9a is rotating in the direction causing the carriage to move into the housing, is installed between the gear and the pinion.

The second characteristic feature of the mechanism for specifying the position to which the recording medium 3 is to be transported is that a stopper 20 is formed at the rear end of the chassis 6 or support member 11. In the former case, the carriage 4 contacts the stopper 20 so that its position is directly restricted with respect to the chassis. In the latter case, the carriage 4, which is moving at an accelerated speed, catches up with the more slowly moving support member, and when a predetermined positional relationship is established between the two members, the carriage 4 contacts the stopper 20 and its position is restricted with respect to the support member. In an example of the latter case, the carriage 4 is so designed as to contact the stopper 20 when a certain positional relationship is established between the support member and the carriage (e.g., when the support member comes into registry with a central reference line on the recording medium retained on the carriage), and the movement of this support member is controlled by a suitable method, such as by use of a potentiometer.

Further in accordance with the present invention, the distribution of driving forces imparted during the movement of the operation control member (i.e., operational substrate 12) in the forward or backward direction is so adjusted that the driving force for this movement will be imparted continuously until a short time after the carriage 4 contacts the stopper.

As a consequence, the operational substrate 12 will be moved backwardly until a short time the carriage 4 contacts the stopper 20 to establish a predetermined positional relationship between these two members. Although this causes a continued application of the rotational driving force applied to the accelerating gear 9, any excess portion of the rotational driving force is absorbed by the energizing device 9e on the accelerating gear 9. At the same time, the energizing device 9e absorbs the play between adjacent members and the backlash, and the energizing force of the energizing device urges the carriage into contact with the stopper. Therefore, the exact required positional relationship between the carriage and the support member can always be attained by the stopper.

Finally, the overall operation of the disk player having the construction described above will hereunder be described, with particular reference being made to the sequence of playing steps, taken in conjunction with FIGS. 12, 13 and 19.

In the first step, the "LOAD" button in the group of switches 1d (see FIG. 1) is depressed to start the motor 31 so that the carriage 4 is caused to project to the outside of the player housing 1, as shown in FIG. 1, in preparation for the loading of the disk type recording medium 3. This movement of the carriage 4 to the outside of the player housing 1 need not be described in further detail since the steps involved are entirely the same as those described below in connection with the movement of the carriage into the housing, except that the order of steps is reversed.

After the recording medium 3 has been loaded on the carriage 4, the "LOAD" button in the group of switches 1d (see FIG. 1) is depressed. Then, the motor 31 (see FIG. 20) starts to rotate to initiate movement of the right-hand first operational substrate 12 and the left-hand first operational substrate 12' in the backward direction (opposite the direction indicated by the arrow Y). As a result, the support members 11 are moved backward while being guided by pins 15 at the point of crossing between the cam slots 17 in the operational substrate 12 and the L-shaped guide slots 14 in the subchassis 6a.

As one of the two support members 11 moves backward, the two sets of double gears 9a and 9b (also see FIGS. 2 and 3) provided on the moving support member will also move backward.

Since the double gear 9b meshes with the intermediate drive rack 23 formed on the intermediate operational substrate 13, the backward movement of the support member 11 causes the double gear 9b to rotate clockwise in FIG. 2. As a result, the other double gear 9a rotates counterclockwise, whereupon the carriage 4 having the rack 4a that meshes with the double gear 9a will be moved backward at a speed four times as fast as the operational substrate 12.

In this way, the carriage 4 reaches the position shown in FIG. 3 or 13 where it contacts the stopper 20 immediately before its backward movement is completed. Hence, the driving force for producing the movement in forward or backward direction is continuously imparted, even after the exact position of the carriage has been determined. This causes the operational substrate 12 to move further backward, and the carriage 4 is energized by the energizing device 9e on the accelerating gear 9 to make contact with the stopper 20, thereby maintaining the already-established positional relationship. As a result, the carriage 4, while maintaining the desired positional relationship with each of the support members 11, will be moved in the loading direction, as shown in FIG. 19. Then, the recording medium 3 is loaded on the turntable 7 or 7a (see FIGS. 1 and 1) while the clamper 40 is lowered to hold the medium in position. Thereafter, the carriage 4 makes a further movement until it separates from the recording medium 3, whereupon the motor 31 stops and the clamping operation is completed.

After the clamping operation is completed, the recording medium 3 is placed in the reproducing mode, that is, the operation is converted from the recording mode to the playing mode.

As already mentioned, after playing of the recording medium has been completed, the motor 31 is rotated in the reverse direction and the carriage 4 is caused to project to the outside of the player housing 1 through the sequence of the above-described steps with their order reversed. Thereafter, the recording medium 3 is unloaded.

The foregoing description of the preferred embodiment of the present invention assumes that the carriage 4 moves both in the forward or backward direction and in the loading direction, but it should be noted that, depending on the manner in which the disk player is installed, the carriage 4 may move back and forth along the Z axis (up and down).

As described above, the present invention provides a disk player that includes a player housing, playing means, a carriage, and a transport mechanism. The transport mechanism is composed of a carriage moving mechanism, an operation control member, and a drive force imparting mechanism. The carriage moving mechanism is composed of support members that are mounted on subchassis in the player housing and which are capable of moving not only in a forward direction (i.e., the direction in which they project from the housing) or in the backward direction (i.e., the direction in which they are accommodated in the housing), but also in the loading direction at the rear position in the housing. The carriage is supported by the support members and is accelerated by an accelerating mechanism when it is moving in the forward or backward direction, the carriage being lowered together with the support members when they move in the loading direction. The operation control member moves in the forward or backward direction, thereby imparting different driving forces for the movement of the support members in the forward or backward direction and in the loading direction, effecting the accelerated movement of the carriage in the forward or backward direction and the movement of the same in the loading direction for the driving of the accelerating mechanism and for the operation of the clamping mechanism. The operation control member also serves to control the movement of the carriage. The drive force imparting mechanism transmits the driving force of a drive source to the operation control member. The support members or the chassis has a stopper with which the carriage comes in contact when the recording medium held on the carriage reaches a predetermined position. The accelerating mechanism is provided with an energizing device that imparts an energizing force at least at the time when the accelerating means is driven in the direction in which the carriage is to be accommodated in the housing. The operation control means is arranged in such a way that the driving force it imparts to the support members for causing their movement in the forward or backward direction and the driving force it also imparts to the accelerating mechanism is continuously applied until a short time after the carriage contacts the stopper.

With this arrangement, any excess driving force applied after the carriage contacts the stopper is absorbed by the energizing device and, at the same time, the carriage is urged against the stopper. Hence, an accurate positional relationship can always be established immediately before the time the carriage and the support members are shifted in mode from movement in the forward or backward direction to the movement in the loading direction. Furthermore, any play that may be present between adjacent components and the consequent backlash can been entirely absorbed by the energizing device and the carriage can be moved in the loading direction to a precisely controlled position so as to ensure that subsequent information reproduction on the disk type recording medium is started in a smooth manner. In short, the system of the present invention offers great benefits in commercial applications in that the positioning of the carriage while it is moved in the direction so as to be accommodated in the housing can be accomplished in a simple and precise manner while problems related to backlash and the like are eliminated.

What is claimed is:

1. In a loading mechanism for a disk player comprising a player housing, playing means disposed in the housing including a turntable for supporting a disk type recording medium, a mechanism for automatically starting, driving and stopping the disk type recording medium on the turntable, and a converter for recording or reproducing information from the disk type recording medium, a carriage for holding, guiding and transporting the disk type recording medium to be played, and transport means for moving the carriage to a medium unloading position wherein the carriage projects from the player housing and to a recording or reproducing position where the carriage is inside the housing, the improvement wherein said transport means comprises: carriage moving means, operation control means, and drive force imparting means, support members mounted on a sub-chassis in said player housing gripping both lateral sides of said carriage and being movable both in a forward direction projecting said carriage from said housing and in a backward direction to accommodate said carriage in said housing, and in a loading direction at a predetermined rearward position in said housing, said carriage being supported by said support members in such a way that said carriage is freely movable in said forward and backward directions, accelerating means on said support members for accelerating movement of said carriage when moving in said forward and backward directions, said carriage being lowered together with said support members when said carriage and support members move in said loading direction, a driving force from said drive force imparting means being divided by said operation control means into a driving force for causing said support members to be moved in said forward and backward directions and in said loading direction, a driving force for said accelerating means, and a driving force for said clamping mechanism, said operation control means also comprising means for controlling movement of said carriage, said drive force imparting means comprising means for transmitting a driving force to said operation control means, one of said support members and said chassis having a stopper with which said carriage comes into contact when said recording medium held on said carriage reaches a predetermined recording or reproducing position, said accelerating means comprising energizing means for imparting an energizing force at least at a time when said accelerating means is driven in a direction in which said carriage is to be accommodated in said housing, said operation control means imparting a driving force to said support members for causing movement of said support members in said forward and backward directions and said driving force to said accelerating means continuously until a short time after said carriage contacts said stopper, said operation control means imparting a driving force to said support members for causing movement of said support members in said forward and backward directions until said carriage, moving backward at an accelerated speed, contacts said stopper, whereupon said recording medium held on said carriage is restricted at a predetermined position, any excess driving force subsequently imparted being absorbed by said energizing means so as to urge said carriage against said stopper.

2. The loading mechanism according to claim 1, wherein said transport means further comprises a rack member disposed parallel to the direction in which said carriage moves, and an accelerating gear that meshes with said rack member and which is also disposed parallel to said direction in which the carry moves; said operation control means comprises an intermediate operational substrate that meshes with said accelerating gear to impart a drive force to said accelerating gear, and an operational substrate that imparts to said support members three difference forces, a first for actuating both a movement in said forward and backward directions and a movement in said loading direction, a second for driving said accelerating means, and a third other for driving said clamp mechanism, said operation control means also controlling movement of said carriage; and further comprising drive force imparting means comprising a drive gear for transmitting a drive force form a motor to said operational substrate; said chassis having a stopper which comes into contact with said carriage when said recording medium has been transported to a predetermined recording or reproducing position, said accelerating gear comprising energizing means for imparting an energizing force at least at a time when said accelerating gear is driven in such a direction that said carriage is accommodated in said housing, a drive force imparted by said operational substrate for moving said support members in said forward and backward directions and said drive force imparted to said accelerating means being continuously applied until a short time after said carriage has contacted said stopper, said carriage when moving backward at an accelerated speed contacting said stopper and establishing a predetermined positional relationship with said chassis a short time before said drive force imparted to said support members by said operational substrate reaches a predetermined limit, whereby said excess drive force is absorbed by said energizing means on said accelerating gear so as to cause said carriage to be urged against said stopper.

3. The loading mechanism according to claim 1, wherein said accelerating means comprises at least one set of double gears.

4. The loading mechanism according to claim 1, wherein said operation control means comprises a single operational substrate having a first drive rack receiving said driving force from said drive force imparting means for causing said operation control means to be moved in said forward and backward directions with respect to said chassis, and a second drive rack for imparting a driving force to said accelerating gear wheel.

5. The loading mechanism according to claim 2, wherein said operation control means comprises an operational substrate and an intermediate operational substrate which move in operative association with each other, said operational substrate having a first drive rack that meshes with said drive gear coupled to said drive source, and said intermediate operational substrate having a second drive rack that meshes with said accelerating gear so as to effect relative movement between said operational substrate and said accelerating gear wheel.

* * * * *